UNITED STATES PATENT OFFICE.

JOHN COLLINS CLANCY, OF PROVIDENCE, RHODE ISLAND, ASSIGNOR TO THE NITROGEN CORPORATION, OF PROVIDENCE, RHODE ISLAND, A CORPORATION OF RHODE ISLAND.

PROCESS OF PREPARING PURIFIED GAS MIXTURES.

1,425,577.    Specification of Letters Patent.    Patented Aug. 15, 1922.

No Drawing.    Application filed May 8, 1920. Serial No. 380,003.

*To all whom it may concern:*

Be it known that I, JOHN COLLINS CLANCY, a subject of the King of Great Britain, residing at Providence, in the county of Providence and State of Rhode Island, have invented certain new and useful Improvements in Processes of Preparing Purified Gas-Mixtures, of which the following is a specification.

This invention is a novel process applicable to the preparation of purified mixtures of hydrogen and nitrogen, suitable for use in connection with the known ammonia syntheses. The process is capable of yielding the gases in their reacting proportions, but it is within the scope of my invention to prepare the purified gases in any desired admixture, and thereafter to enrich the mixture in either component as may be required.

Following is a preferred manner of carrying my invention into effect, it being understood that the invention is not restricted to the details of the described procedure.

I first subject a suitable gas-oil to a cracking or decomposing operation in presence of sufficient air and steam to avoid any substantial separation of carbon. The decomposition is carried out at a high temperature (of the general order of 1200° C.) in a series of tubes of iron-chromium alloy or equivalent highly refractory material; and yields a crude gas-mixture consisting essentially of hydrogen, nitrogen, carbon monoxid, carbon dioxid, and water vapor. This mixture passes first in contact with ferric oxid or other suitable catalyst at substantially the above-mentioned temperature, whereby the bulk of the carbon monoxid is oxidized to carbon dioxid at the expense of the steam, with further formation of hydrogen. Any residual carbon monoxid is then eliminated from the gas-mixture by preferential combustion in known manner in presence of a catalyst, which may advantageously be a highly expanded metallic catalyst of the type described in my copending application Serial Number 380,002, filed May 8, 1920, said catalyst containing silver or copper, or mixtures thereof, derived by thermal decomposition from the corresponding metal cyanamids.

The gas-mixture now consists substantially of hydrogen, nitrogen and carbon dioxid; and if the reacting bodies in the original decomposing operation have been duly proportioned to secure such result, the hydrogen and nitrogen may be present in substantially the 3 : 1 ratio required for the ammonia syntheses. The next step consists in completely eliminating the carbon dioxid from the mixture.

According to the present invention this is accomplished by bringing the gas-mixture, freed from carbon monoxid, into intimate contact with ammonia, preferably in the form of an aqueous ammoniacal solution, whereby the carbon dioxid is wholly removed as an ammonium carbonate. The hydrogen and nitrogen traverse this solution unchanged but in highly purified state, the sole remaining contaminants being ammonia and aqueous vapor. Of these the former, in the proportions in which it is present, is quite unobjectionable, since it constitutes the product of the synthesis; and the latter, if objectionable in the catalysis, is readily removed by known drying processes. In case concentrated sulfuric acid is employed as the drying agent the ammonia and aqueous vapor are simultaneously eliminated.

The purified gases, consisting essentially of hydrogen and nitrogen in proper reacting proportions, are then caused to unite under pressure and at high temperatures, yielding ammonia. This operation may be carried out in any known or desired manner, although preferably in presence of a catalyst comprising a metallic cyanamid, as described in my copending application Serial Number 283,012, filed March 17, 1919. The resulting gaseous ammonia is absorbed in water, and a sufficient proportion of the resulting ammoniacal solution to combine with the total carbon dioxid content of the gas-mixture, is transferred to the gas-purifying system. In practice this usually amounts to substantially the entire output of ammonia, so that the direct product of the process consists substantially of ammonium carbonate. If the carbon dioxid content of the gas is such as to require for its neutralization ammonia in excess of that resulting from the catalysis, the required excess may of course be supplied from other sources. Such ammonia introduced from outside sources must however be carefully freed from possible contaminants for the gases, since it is a fundamental advantage of my process that there is no liability of contaminating the gas-mixture by impurities introduced into the system from an external source with the purifying agent. The ammonium carbonate is a salable product and may be disposed of as such. Or if preferred it may be transformed into ammonium sulfate in any desired and appropriate manner. For example the ammonium carbonate may be treated in aqueous solution with the equivalent proportion of sulfuric acid, the evolved carbon dioxid being collected and liquefied if desired as a merchantable product. Or, as a modified procedure, the ammonium carbonate may be converted into sulfite by reaction with sulfur dioxide, the sulfite being thereafter oxidized to sulfate in any appropriate way, as for example by subjecting its aqueous solution to intimate contact with air, preferably in presence of a catalyst such as vanadium pentoxide.

I claim:—

1. Process of preparing purified gas-mixtures consisting essentially of hydrogen and nitrogen, comprising decomposing a hydrocarbon in presence of air and steam to prepare a crude gas-mixture containing hydrogen, nitrogen, oxids of carbon and water vapor; oxidizing any carbon monoxid to carbon dioxid; and passing the residual gases in contact with ammonia to eliminate carbon dioxid and purify the mixture.

2. Process of preparing purified gas-mixtures consisting essentially of hydrogen and nitrogen, comprising decomposing a hydrocarbon in presence of air and steam proportioned to yield an ultimate purified gas-mixture containing hydrogen and nitrogen in substantially the ratio required for the ammonia synthesis, preparing thereby a crude gas-mixture containing hydrogen, nitrogen, oxids of carbon and water vapor; oxidizing any carbon monoxid to carbon dioxid by reaction with steam; and passing the residual gases in contact with ammonia to eliminate carbon dioxid and purify the mixture.

3. Process of preparing purified gas-mixtures consisting essentially of hydrogen and nitrogen, comprising decomposing a hydrocarbon in the presence of air and steam to form a gas mixture containing hydrogen and nitrogen in the desired proportion together with other gaseous products, and eliminating the said other gaseous products from the mixture.

4. In a process of making ammonia the steps which comprise, combining nitrogen and hydrogen whereby synthetic ammonia is formed, reacting upon the carbon dioxid component of a gas-mixture containing hydrogen, nitrogen, and carbon dioxid, with said synthetic ammonia whereby a purified gas-mixture consisting essentially of hydrogen and nitrogen is obtained, and utilizing said purified gas-mixture in the synthesizing step.

5. In a process of making ammonia the steps which comprise, combining nitrogen and hydrogen whereby synthetic ammonia is formed, reacting upon the carbon dioxid component of a gas-mixture containing hydrogen, nitrogen, and carbon dioxid, the hydrogen and nitrogen in substantially the ratio required for ammonia synthesis, whereby a purified gas-mixture consisting essentially of hydrogen and nitrogen is obtained, and utilizing said gas mixture in the synthesizing step.

6. Process of preparing purified gas mixtures consisting essentially of hydrogen and nitrogen, comprising passing a gas mixture containing hydrogen, nitrogen, and carbon dioxid in contact with ammonia free from contaminating impurities.

7. Process of preparing purified gas mixtures consisting essentially of hydrogen and nitrogen, comprising passing a gas mixture containing hydrogen, nitrogen, and carbon dioxid in contact with ammonia resulting from the synthesis of a mixture of hydrogen and nitrogen free from contaminating impurities.

In testimony whereof, I affix my signature.

JOHN COLLINS CLANCY.